United States Patent
Lin et al.

(10) Patent No.: US 8,145,010 B2
(45) Date of Patent: Mar. 27, 2012

(54) IMAGE PROCESSING SYSTEM AND METHOD

(75) Inventors: Po-Jung Lin, Hsinchu (TW); Shuei-Lin Chen, Hsinchu (TW)

(73) Assignee: Altek Corporation, Science Park, Hsinchu (TW)

( * ) Notice: Subject to any disclaimer, the term of this patent is extended or adjusted under 35 U.S.C. 154(b) by 767 days.

(21) Appl. No.: 12/314,540

(22) Filed: Dec. 12, 2008

(65) Prior Publication Data

US 2009/0154840 A1    Jun. 18, 2009

(30) Foreign Application Priority Data

Dec. 12, 2007   (TW) .............................. 96147500 A (51) Int. Cl.
*G06K 9/36*   (2006.01)
*G06K 9/54*   (2006.01)

(52) U.S. Cl. ...................... 382/276; 382/305
(58) Field of Classification Search .................. 382/276, 382/296, 297, 298, 300, 305
See application file for complete search history.

(56) References Cited

U.S. PATENT DOCUMENTS

| | | | | |
|---|---|---|---|---|
| 5,634,088 A * | 5/1997 | Banton | ........................... | 358/1.2 |
| 5,867,612 A * | 2/1999 | Robson | ........................... | 382/298 |
| 6,307,651 B1 * | 10/2001 | Ohtani et al. | .................. | 358/524 |
| 6,310,986 B2 * | 10/2001 | Robey et al. | ................... | 382/296 |
| 6,937,291 B1 * | 8/2005 | Gryskiewicz | ................. | 348/581 |
| 7,629,987 B1 * | 12/2009 | De Waal | ........................ | 345/649 |
| 2002/0191865 A1 * | 12/2002 | Yamaguchi et al. | ........... | 382/297 |
| 2006/0159350 A1 * | 7/2006 | Watanabe | ...................... | 382/232 |

* cited by examiner

*Primary Examiner* — Yon Couso
(74) *Attorney, Agent, or Firm* — Winston Hsu; Scott Margo (57) ABSTRACT

An image processing system includes a first memory for storing a first image data, the first image data having a plurality of pixels; a second memory for storing at least one mapping table, the mapping table recording the mapped positions of at least a portion of pixels; a direct memory access control unit for accessing the first memory and the second memory; a first processing unit for accessing the first image data and the mapping table via the direct memory access control unit so as to produce a second image data; and a third memory for storing the second image data.

14 Claims, 6 Drawing Sheets

| (0,5) | (1,5) | (2,5) | (3,5) | (4,5) | (5,5) | (6,5) | (7,5) |
|---|---|---|---|---|---|---|---|
| (0,4) | (1,4) | (2,4) | (3,4) | (4,4) | (5,4) | (6,4) | (7,4) |
| (0,3) | (1,3) | (2,3) | (3,3) | (4,3) | (5,3) | (6,3) | (7,3) |
| (0,2) | (1,2) | (2,2) | (3,2) | (4,2) | (5,2) | (6,2) | (7,2) |
| (0,1) | (1,1) | (2,1) | (3,1) | (4,1) | (5,1) | (6,1) | (7,1) |
| (0,0) | (1,0) | (2,0) | (3,0) | (4,0) | (5,0) | (6,0) | (7,0) |

Fig. 7

| before mapping | after mapping | before mapping | after mapping | before mapping | after mapping | before mapping | after mapping | before mapping | after mapping | before mapping | after mapping | before mapping | after mapping | before mapping | after mapping |
|---|---|---|---|---|---|---|---|---|---|---|---|---|---|---|---|
| (0,0) | (7,0) | (1,0) | (6,0) | (2,0) | (5,0) | (3,0) | (4,0) | (4,0) | (3,0) | (5,0) | (2,0) | (6,0) | (1,0) | (7,0) | (0,0) |
| (0,1) | (7,1) | (1,1) | (6,1) | (2,1) | (5,1) | (3,1) | (4,1) | (4,1) | (3,1) | (5,1) | (2,1) | (6,1) | (1,1) | (7,1) | (0,1) |
| (0,2) | (7,2) | (1,2) | (6,2) | (2,2) | (5,2) | (3,2) | (4,2) | (4,2) | (3,2) | (5,2) | (2,2) | (6,2) | (1,2) | (7,2) | (0,2) |
| (0,3) | (7,3) | (1,3) | (6,3) | (2,3) | (5,3) | (3,3) | (4,3) | (4,3) | (3,3) | (5,3) | (2,3) | (6,3) | (1,3) | (7,3) | (0,3) |
| (0,4) | (7,4) | (1,4) | (6,4) | (2,4) | (5,4) | (3,4) | (4,4) | (4,4) | (3,4) | (5,4) | (2,4) | (6,4) | (1,4) | (7,4) | (0,4) |
| (0,5) | (7,5) | (1,5) | (6,5) | (2,5) | (5,5) | (3,5) | (4,5) | (4,5) | (3,5) | (5,5) | (2,5) | (6,5) | (1,5) | (7,5) | (0,5) |

Fig. 8

| (0,5) | (1,5) | (2,5) | (3,5) | (4,5) | (5,5) | (6,5) | (7,5) |
|---|---|---|---|---|---|---|---|
| (0,4) | (1,4) | (2,4) | (3,4) | (4,4) | (5,4) | (6,4) | (7,4) |
| (0,3) | (1,3) | (2,3) | (3,3) | (4,3) | (5,3) | (6,3) | (7,3) |
| (0,2) | (1,2) | (2,2) | (3,2) | (4,2) | (5,2) | (6,2) | (7,2) |
| (0,1) | (1,1) | (2,1) | (3,1) | (4,1) | (5,1) | (6,1) | (7,1) |
| (0,0) | (1,0) | (2,0) | (3,0) | (4,0) | (5,0) | (6,0) | (7,0) |

IMAGE PROCESSING SYSTEM AND METHOD

CROSS-REFERENCE TO RELATED APPLICATION

This application claims priority from Taiwan Patent Application No. 096147500 filed Dec. 12, 2007, which is hereby incorporated herein by reference in its entirety.

FIELD OF THE INVENTION

This invention relates to image processing systems and methods, and more particularly, to image processing systems and methods that can enhance the speed of image processing by way of a hardware design of mapping table.

BACKGROUND OF THE INVENTION

Image processing techniques include, but not limited to, geometric transform, rotation, mirror, scaling, resolution change, and so on. Conventional software for realizing image processing techniques normally runs at low speed. This drawback particularly manifests in some electronic devices, such as camera cellular phones, digital cameras, GPSs and so on, which require real-time processing. These electronic devices will be more pragmatic if the image processing speed could enhance. Further, if images captured by the image capture element of these electronic devices experience insufficient brightness, insufficient contrast, and geometric distortion, such as barrel distortion, trapezoid distortion, parallelogram distortion, or pincushion distortion, these electronic devices are considered as malfunction.

SUMMARY OF THE INVENTION

The first objective of the present invention is to provide an image processing system which utilizes hardware design of a mapping table to enhance the image processing speed.

The second objective of the present invention is to provide an image processing method for an image processing system, which utilizes hardware design of a mapping table to enhance the image processing speed.

In accordance with one aspect of the invention, there is provided an image processing system which includes a first memory for storing a first image data, the first image data having a plurality of pixels; a second memory for storing at least one mapping table, the mapping table recording the mapped positions of at least a portion of pixels; a direct memory access control unit for accessing the first memory and the second memory; a first processing unit for accessing the first image data and the mapping table via the direct memory access control unit so as to produce a second image data; and a third memory for storing the second image data. In an exemplary embodiment, the mapping table records mapped positions of all pixels. In another exemplary embodiment, the second memory is coupled to an external memory for pre-storing the mapping table. In another exemplary embodiment, the image processing system further comprises a second processing unit for producing a mapping table according to a user's demand. In another exemplary embodiment, if the first image data are symmetric, the mapping table only stores data for representative pixels and the second memory further stores a de-symmetric data, for producing the second image data by using the data for representative pixels and the de-symmetric data. In another exemplary embodiment, the first processing unit produces the second image data by moving a portion of the pixels in the first image data to the mapped positions according to the mapping positions for the portion of the pixels recorded in the mapping table and by obtaining the data of the remaining portion by way of an interpolation method. In another exemplary embodiment, the third memory stores the second image data in a raster manner. In another exemplary embodiment, the third memory stores the second image data in a block-based manner.

In accordance with another aspect of the invention, there is provided an image processing method for an image processing system, the image processing system includes a first memory for storing a first image data, the first image data having a plurality of pixels; a second memory for storing an mapping table, the mapping table recording mapped positions of at least a portion of pixels; a third memory; a direct memory access control unit; and a first processing unit. The image processing method comprises the steps of: accessing the first image data and the mapping table; producing a second image data according to the first image data and the mapping table; and storing the second image data to the third memory. In an exemplary embodiment, the mapping table records mapped positions of all pixels. In another exemplary embodiment, the second memory is coupled to an external memory, the method further comprises: pre-storing at least one mapping table in the external memory. In another exemplary embodiment, the image processing system comprises a second processing unit, the method further comprises: the second processing unit producing a mapping table according to a user's demand. In another exemplary embodiment, when the first image data are symmetric, the mapping table only stores data for representative pixels and the second memory further stores a de-symmetric data, for producing the second image data by using the data for representative pixels and the de-symmetric data. In another exemplary embodiment, the first processing unit produces the second image data by moving a portion of the pixels in the first image data to the mapped positions according to the mapping positions for the portion of the pixels recorded in the mapping table and by obtaining the data of the remaining portion by way of an interpolation method. In another exemplary embodiment, the third memory stores the second image data in a raster manner. In another exemplary embodiment, the third memory stores the second image data in a block-based manner.

BRIEF DESCRIPTION OF DRAWINGS

The foregoing and advantages of the invention will be appreciated more fully from the following further description thereof with reference to the accompanying drawings wherein.

DETAILED DESCRIPTION OF SPECIFIC EMBODIMENTS

The following exemplary examples will be described in detail with the appended drawings in order to make the aforementioned objectives, functional features, and advantages more clearly understood.

Figure 1:
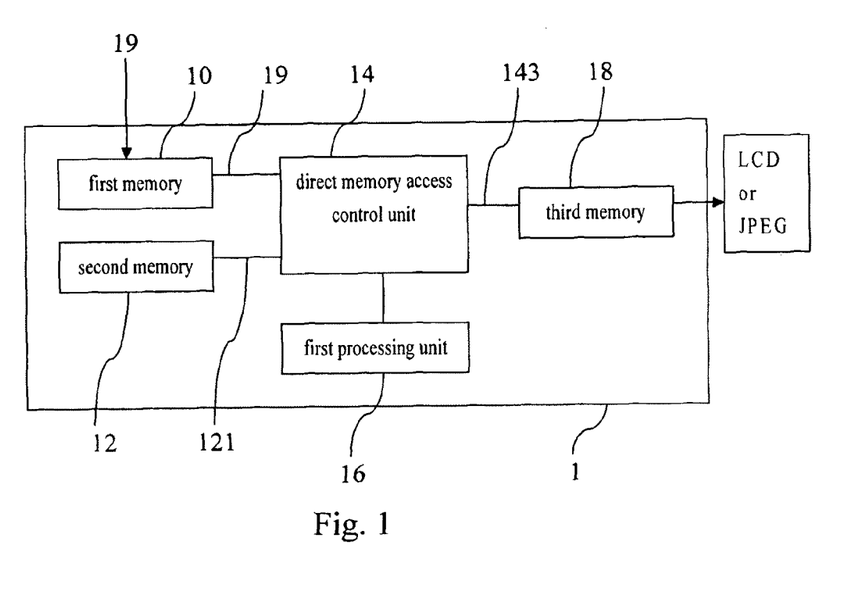
FIG. 1 shows an image processing system 1 according to a preferred embodiment of the present invention.

FIG. 1 shows an image processing system 1 according to a preferred embodiment of the present invention. The image processing system 1 includes a first memory 10 for storing a first image data 19, the first image data 19 having a plurality of pixels; a second memory 12 for storing at least one mapping table 121, the mapping table 121 recording the mapped positions of at least a portion of pixels; a direct memory access control unit 14 for accessing the first memory 10 and the second memory 12; a first processing unit 16 for accessing the first image data 19 and the mapping table 121 via the direct memory access control unit 14 so as to produce a second image data 143; and a third memory 18 for storing the second image data 143.

Figure 7:
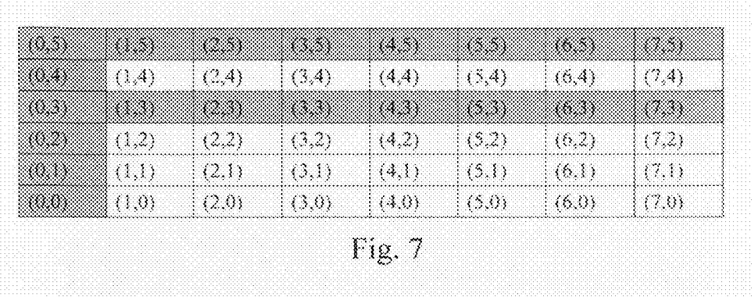
FIG. 7 shows an example of the image data before mapping.
Figure 8:
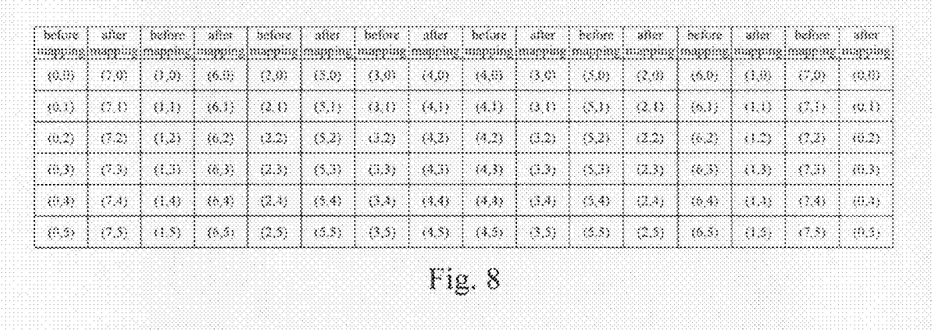
FIG. 8 shows an example of the mapping table according to a preferred embodiment of the present invention.
Figure 9:
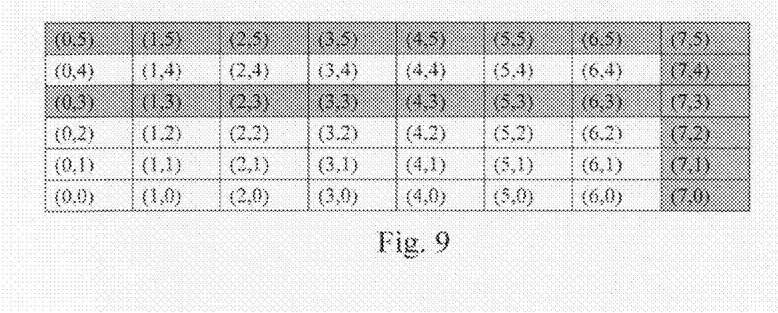
FIG. 9 shows an example of the image data after mapping.
Figure 10:
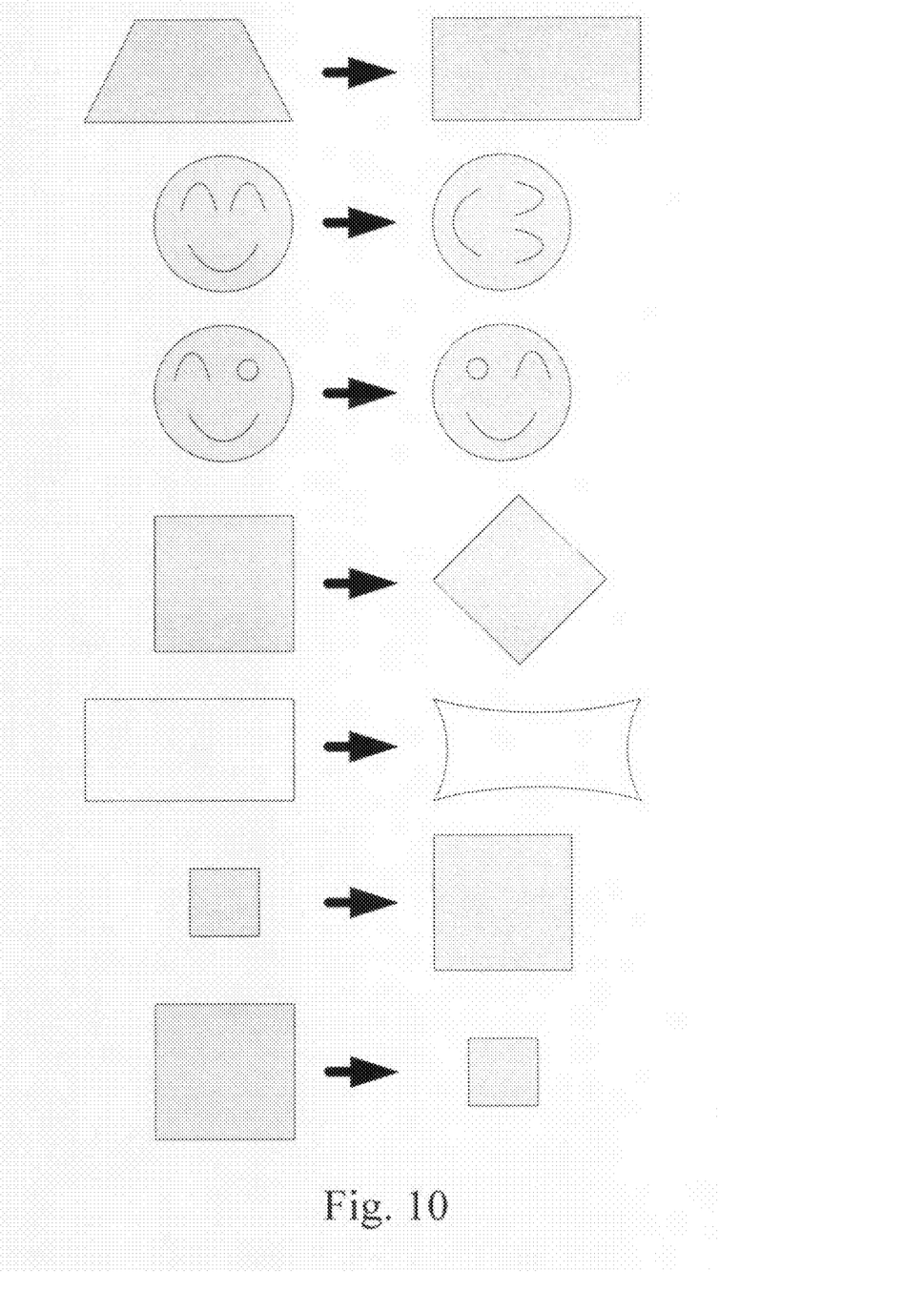
FIG. 10 shows different image processing types.

In particular, the first image data 19 can be captured by any kind of electronic devices with image capture element (not shown, such as digital camera, camera cellular phone and so on.) and stored in the first memory 10. According to the resolution setting of the image capture element, the first image data 19 has corresponding amount of pixels, such as 640*480, 800*600, 1024*768 and so on. FIG. 7 shows an example of an image data. To explain the invention by way of example, it is shown by only 8*6 pixels and two grey-level values. Persons with ordinary skill in the art readily understand that the color value of each pixel also could be displayed in RGB or CMYK. In FIG. 7, (0,0), (0,1), . . . , (7,5) are the coordinates of the pixels. The grey-level value of pixels of darker color at coordinates (0,0), (0,1), . . . etc, is, for example, 50. The grey-level value of pixels of lighter color at coordinates (1,0), (2,0), . . . etc, is, for example, 255. A mapping table 121 of lighter color is stored in the second memory 12, and the mapping table 121 records the mapped positions of at least a portion of pixels stored in the first memory 10. The direct memory access control unit 14 is used to access the first image data 19 of the first memory 10 and the mapping table 121 of the second memory 12. In connection with the image data of FIG. 7, FIG. 8 shows an example of the mapping table 121 according to a preferred embodiment of the present invention. The mapping table 121 in FIG. 8 records the mapped positions of pixels shown in FIG. 7. As shown, the mapped position of the pixel with coordinate (0,0) before mapping is coordinate (7,0). That is, the grey-level value of pixel at coordinate (7,0) will become the grey-level value of the pixel before mapping at coordinate (0,0). Similarly, the mapped position of the pixel with coordinate (0,1) before mapping is coordinate (7,1). That is, the grey-level value of pixel at coordinate (7,1) will become the grey-level value of the pixel before mapping at coordinate (0,1). In this manner, the first image data 19 and the mapping table 121 are accessed by the first processing unit 16 via the direct memory access control unit 14. After finishing all the mapping operation listed in the mapping table 121, a second image data 143 are produced, as shown in FIG. 9. The second image data 143 are stored in the third memory 18. The function, as indicated by FIG. 7 and FIG. 9, accomplished by this mapping table 121 is called "mirror". In an exemplary embodiment, other desired functions can be accomplished in accordance with preset and stored mapping tables. In FIG. 10, functions such as trapezoid-to-rectangle, rotation, mirror, rectangle-to-rhombus, fish-eye, scale, irregular change and so on are shown. Since the mapping table 121 is stored in a memory (the second memory 12 in this case), as compared to the conventional software techniques for image processing, the invention has higher image processing speed, especially in platforms which that real-time processing, such as camera cellular phones, digital cameras, GPSs and so on.

Figure 2:
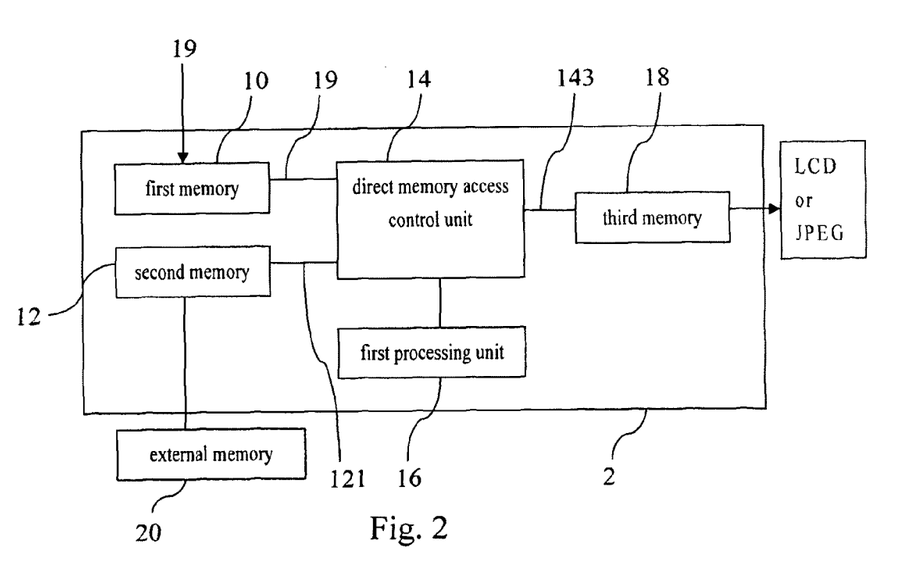
FIG. 2 shows an image processing system 2 according to another preferred embodiment of the present invention.

FIG. 2 shows an image processing system 2 according to another preferred embodiment of the present invention. The image processing system 2 further includes an external memory 20. In an exemplary embodiment, a mapping table 121 is pre-stored in the external memory 20. The external memory 20 is coupled to the second memory 12. When the system 2 is going to use the mapping table 121, the mapping table 121 is copied to the second memory 12. Persons with ordinary skill in the art readily understand that the first memory 10, the second memory 12, and the third memory 18 can be SRAM, DRAM, SDRAM, ROM, PROM, EPROM, OTPROM, EEPROM, or Flash memory, and so on. The external memory 20 can be SD card which is made of Flash memory.

Figure 3:
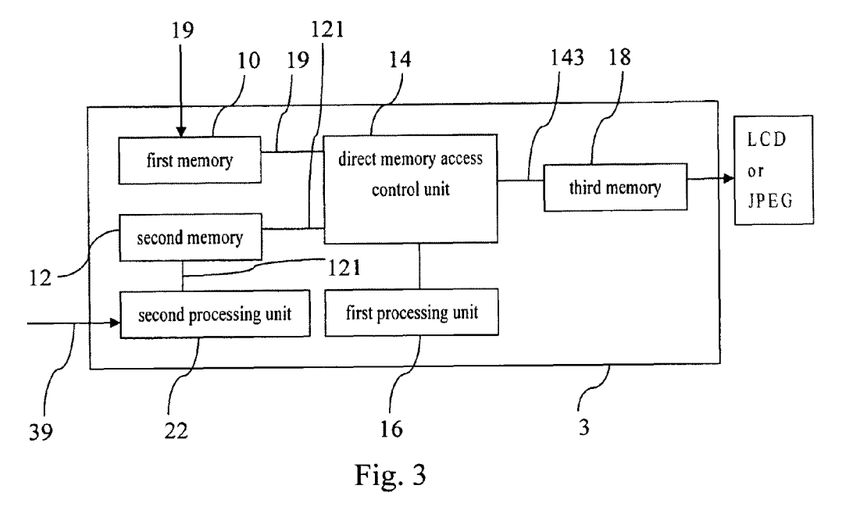
FIG. 3 shows an image processing system 3 according to another preferred embodiment of the present invention.

FIG. 3 shows an image processing system 3 according to another preferred embodiment of the present invention. As compare to the image processing system 1, the image processing system 3 further includes a second processing unit 22 for producing a mapping table 121 according to a user's demand 39. For example, a mirror processing is chosen by a user's demand 39. Since the parameters of the mapping table 121 of mirror processing have regularities, the parameters are produced by the second processing unit 22 in real-time. In other words, the data of the mapping table 121 shown in FIG. 8 are produced by the second processing unit 22 and are stored in the second memory 12. Therefore, the size of the memory is reduced.

In another exemplary embodiment, if the first image data 19 are symmetric, the mapping table 121 only stores data for representative pixels and the second memory 12 further stores a de-symmetric data, for producing the second image data 143 by using the data for representative pixels and the de-symmetric data. For example, as the first image data 19 are top-and-bottom symmetric, then the data for representative pixels are the top half pixels, and the de-symmetric data describes its symmetric rule. Therefore, this image processing can be accomplished by only half memory. Thus, the requirement of the memory is lowered.

In another exemplary embodiment, the first processing unit 16 produces the second image data 143 via the direct memory access control unit 14 by moving a portion of the pixels in the first image data 19 to the mapped positions according to the mapping positions for the portion of the pixels recorded in the mapping table 121 and by obtaining the data of the remaining portion by way of an interpolation method. Since the mapping table 121 only records the mapped positions of a portion of the pixels, the amount of the pixels which are moved to the mapped positions is less than the amount of the pixels of the first image data 19. Under the condition, the data of the remaining portion of pixels are obtained by way of the interpolation methods in the art. For example, the grey-level value of the pixel at coordinate (0,5) is obtained by averaging the grey-level values of the pixels at coordinate (0,4), (1,4), (1,5).

The grey-level value of the pixel at coordinate (3,2) is obtained by averaging the grey-level values of the pixels at coordinate (2,1), (2,2), (2,3), (3,1), (3,3), (4,1), (4,2), (4,3).

Figure 4:
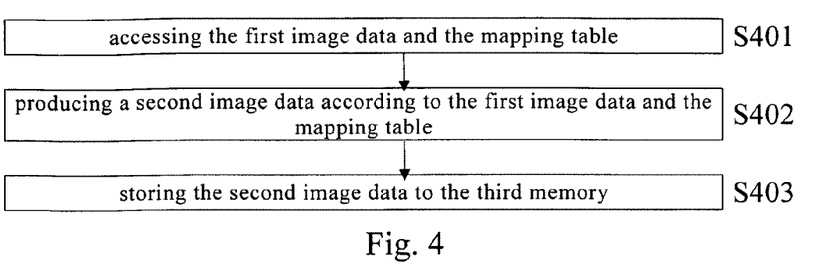
FIG. 4 shows a flow chart of the image processing method of the image processing system 1 according to a preferred embodiment of the present invention.
Figure 11:
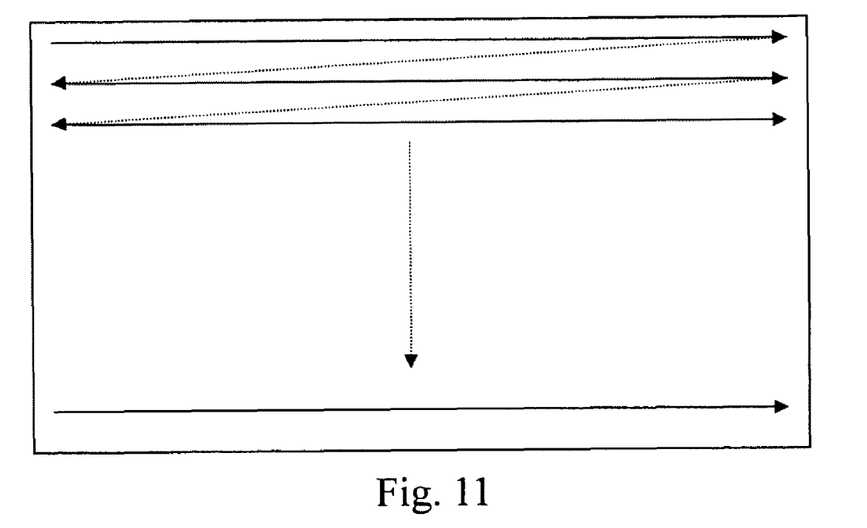
FIG. 11 shows how the image data are stored in a raster manner.
Figure 12:
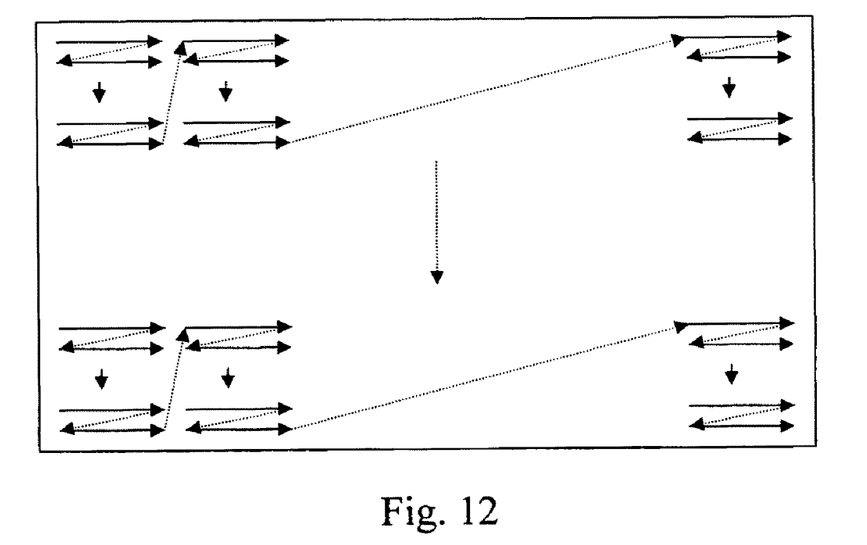
FIG. 12 shows how the image data are stored in a block-based manner.

In another exemplary embodiment, the image data are stored in different manners according to different specific applications. For example, as the specific application is in "LCD", the second image data 143 are stored in the third memory 18 in a raster manner (as shown in FIG. 11); and as the specific application is in "JPEG", the second image data 143 are stored in the third memory 18 in a block-based manner (as shown in FIG. 12). Since LCD shows images in raster manner and JPEG splits images into blocks of 8*8 pixels for compression and de-compression purposes, the present invention directly stores the image data in the required format (raster or block-based) according to the specific application without additional transform step (that is, raster to block-based, or block-based to raster). FIG. 4 shows a flow chart of the image processing method of the image processing system 1 according to a preferred embodiment of the present invention. The image processing system 1 includes a first memory 10 for storing a first image data 19, the first image data 19 having a plurality of pixels; a second memory 12 for storing an mapping table 121, the mapping table 121 recording mapped positions of at least a portion of pixels; a third memory 18; a direct memory access control unit 14; and a first processing unit 16. In step S401, the direct memory access control unit 14 accesses the first image data 19 and the mapping table 121. In step S402, the first processing unit 16 produces a second image data 143 by accessing the first image data 19 and the mapping table 121 by the direct memory access control unit 14. In step S403, the second image data 143 are stored to the third memory 18. In an exemplary embodiment, the mapping table 121 records mapped positions of all pixels.

Figure 5:
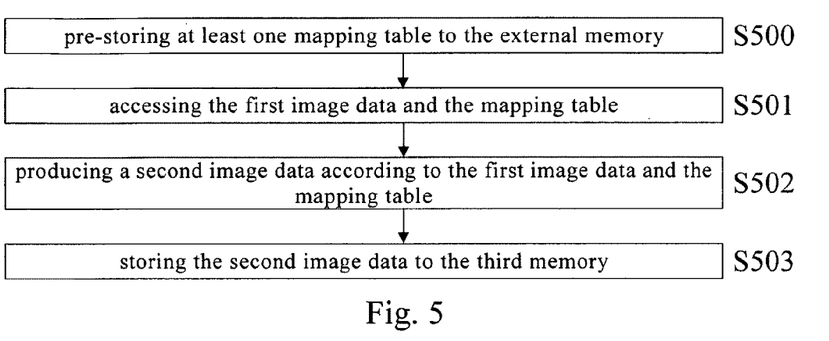
FIG. 5 shows a flow chart of the image processing method of image processing system 2 according to another preferred embodiment of the present invention.

FIG. 5 shows a flow chart of the image processing method of the image processing system 2 according to another preferred embodiment of the present invention. The image processing system 2 includes a first memory 10 for storing a first image data 19, the first image data 19 having a plurality of pixels; a second memory 12 for storing an mapping table 121, the mapping table 121 recording mapped positions of at least a portion of pixels; a third memory 18; a direct memory access control unit 14; a first processing unit 16; and an external memory 20. In step S500, at least one mapping table 121 is pre-stored in the external memory 20, wherein the mapping table 121 is copied to the second memory 12. In step S501, the direct memory access control unit 14 accesses the first image data 19 and the mapping table 121. In step S502, the first processing unit 16 produces a second image data 143 by accessing the first image data 19 and the mapping table 121 by the direct memory access control unit 14. In step S503, the second image data 143 are stored to the third memory 18.

Figure 6:
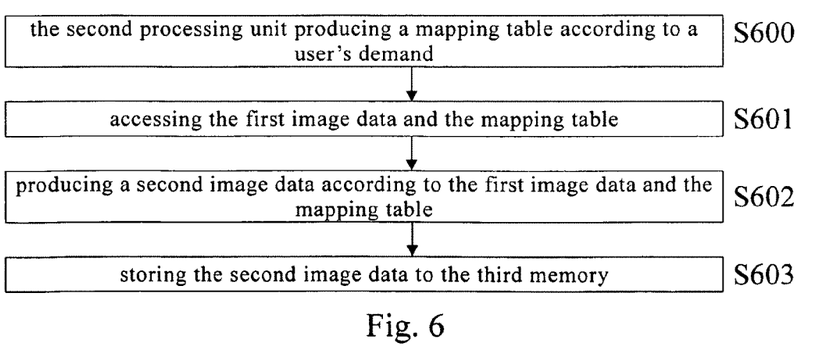
FIG. 6 shows a flow chart of the image processing method of image processing system 3 according to another preferred embodiment of the present invention.

FIG. 6 shows a flow chart of the image processing method of the image processing system 3 according to another preferred embodiment of the present invention. The image processing system 3 includes a first memory 10 for storing a first image data 19, the first image data 19 having a plurality of pixels; a second memory 12 for storing an mapping table 121, the mapping table 121 recording mapped positions of at least a portion of pixels; a third memory 18; a direct memory access control unit 14; a first processing unit 16; and an external memory 20. In step S600, the second processing unit 22 produces a mapping table 121 according to a user's demand. In step S601, the direct memory access control unit 14 accesses the first image data 19 and the mapping table 121. In step S602, the first processing unit 16 produces a second image data 143 by accessing the first image data 19 and the mapping table 121 by the direct memory access control unit 14. In step S603, the second image data 143 are stored to the third memory 18.

In another exemplary embodiment, as the first image data 19 are symmetric, the mapping table 121 only stores data for representative pixels and the second memory 12 further stores a de-symmetric data, for producing the second image data 143 by using the data for representative pixels and the de-symmetric data. As the above-mentioned embodiment, this image processing is accomplished by as half memory as otherwise required.

In another exemplary embodiment, the first processing unit 16 produces the second image data 143 by moving a portion of the pixels in the first image data 19 to the mapped positions according to the mapping positions for the portion of the pixels recorded in the mapping table 121 and by obtaining the data of the remaining portion by way of an interpolation method. As the above-mentioned embodiment, since the mapping table 121 only records the mapped positions of a portion of the pixels, the amount of the pixels which are moved to the mapped positions is less than the amount of the pixels of the first image data 19. Under the condition, the data of the remaining portion of pixels are obtained by way of interpolation methods in the art.

In another exemplary embodiment, as the specific application is in "LCD", the second image data 143 are stored in a raster manner (as shown in FIG. 11); and as the specific application is in "JPEG", the second image data 143 are stored in a block-based manner (as shown in FIG. 12).

Due to undesired reasons (for example, malfunction, improper usage, design failure and so no), a digital camera produces barrel distortion. After observing the pattern of the barrel distortion, a mapping table 121 used to fix the barrel distortion may be designed and stored in the digital camera. Then, the captured images are first processed using the mapping table 121 for performing compensation. Therefore, the image barrel distortion defect is compensated.

While various exemplary embodiments of the present invention are described herein, it should be noted that the present invention may be embodied in other specific forms, including various modifications and improvements, without departing from the sprit and scope of the present invention. Thus, the described embodiments are to be considered in all respects only as illustrative and not restrictive.

What is claimed is:

1. An image processing system, comprising: a first memory for storing a first image data, the first image data having a plurality of pixels; a second memory for storing at least one mapping table, the mapping table recording the mapped positions of at least a portion of pixels; a direct memory access control unit for accessing the first memory and the second memory; a first processing unit for accessing the first image data and the mapping table via the direct memory access control unit so as to produce a second image data; and a third memory for storing the second image data; wherein when the first image data are symmetric, the mapping table only stores data for representative pixels and the second memory further stores a de-symmetric data, so that the first processing unit produces the second image data by using the data for representative pixels and the de-symmetric data.

2. An image processing system according to claim 1, wherein the mapping table records mapped positions of all pixels.

3. An image processing system according to claim 1, wherein the second memory is coupled to an external memory for pre-storing the mapping table.

4. An image processing system according to claim 1, further comprising: a second processing unit for producing a mapping table according to a user's demand.

5. An image processing system according to claim 1, wherein the first processing unit produces the second image data by moving a portion of the pixels in the first image data to the mapped positions according to the mapping positions for the portion of the pixels recorded in the mapping table and by obtaining the data of the remaining portion by way of an interpolation method.

6. An image processing system according to claim 1, wherein the third memory stores the second image data in a raster manner.

7. An image processing system according to claim 1, wherein the third memory stores the second image data in a block-based manner.

8. An image processing method for an image processing system, the image processing system comprising a first memory for storing a first image data, the first image data having a plurality of pixels; a second memory for storing a mapping table, the mapping table recording mapped positions of at least a portion of pixels; a third memory; a direct memory access control unit; and a first processing unit, the image processing method comprising the steps of: the first processing unit accessing the first image data and the mapping table via the direct memory access control unit; the first processing unit producing a second image data according to the first image data and the mapping table; and the third memory storing the second image data to the third memory; wherein when the first image data are symmetric, the mapping table only stores data for representative pixels and the second memory further stores a de-symmetric data, so that the first processing unit produces the second image data by using the data for representative pixels and the de-symmetric data.

9. An image processing method according to claim 8, wherein the mapping table records mapped positions of all pixels.

10. An image processing method according to claim 8, wherein the second memory is coupled to an external memory, and the image processing method further comprises: the second memory pre-storing at least one mapping table in the external memory.

11. An image processing method according to claim 8, wherein the image processing system further comprises a second processing unit, and the image processing method further comprises: the second processing unit producing a mapping table according to a user's demand.

12. An image processing method according to claim 8, wherein the first processing unit produces the second image data by moving a portion of the pixels in the first image data to the mapped positions according to the mapping positions for the portion of the pixels recorded in the mapping table and by obtaining data of the remaining portion by way of an interpolation method.

13. An image processing method according to claim 8, wherein the third memory stores the second image data in a raster manner.

14. An image processing method according to claim 8, wherein the third memory stores the second image data in a block-based manner.

* * * * *